United States Patent [19]
Alexander

[11] Patent Number: 5,934,857
[45] Date of Patent: Aug. 10, 1999

[54] AUTOMATIC WHEEL CHOCK SYSTEM

[75] Inventor: James C Alexander, London, Canada

[73] Assignee: United Dominion Ind., Inc, Charlotte, N.C.

[21] Appl. No.: 08/754,810

[22] Filed: Nov. 21, 1996

[51] Int. Cl.[6] .................................................. B65G 67/02
[52] U.S. Cl. ......................................... 414/401; 414/584
[58] Field of Search .................................. 414/401, 396, 414/584; 188/32; 410/30

[56] References Cited

U.S. PATENT DOCUMENTS

| | | | |
|---|---|---|---|
| 2,661,505 | 12/1953 | Dilione | 20/1.12 |
| 3,305,049 | 2/1967 | Willey | 188/32 |
| 4,207,019 | 6/1980 | Cone | 188/32 X |
| 4,264,259 | 4/1981 | Hipp | 414/401 |
| 4,443,150 | 4/1984 | Hahn et al. | 414/401 |
| 4,969,792 | 11/1990 | Ellis et al. | 414/401 |
| 5,120,181 | 6/1992 | Alexander | 414/401 |
| 5,249,905 | 10/1993 | Warner et al. | 414/401 |
| 5,259,718 | 11/1993 | Alexander | 414/401 |
| 5,375,965 | 12/1994 | Springer et al. | 414/786 |
| 5,582,498 | 12/1996 | Springer et al. | 414/401 |
| 5,709,518 | 1/1998 | Alexander et al. | 414/401 |
| 5,743,697 | 4/1998 | Alexander | 414/401 |

OTHER PUBLICATIONS

Pentalift drawing, 2 pages, Jun. 1992.
Combar brochure, Automatische Vergrendeling, 5 pages; no date.
Kelley Auto Chock Truck Restraint, 2 pages, no date.

*Primary Examiner*—Stephen T. Gordon
*Attorney, Agent, or Firm*—Sughrue, Mion, Zinn, Macpeak & Seas, PLLC

[57] ABSTRACT

A chocking device for securing a vehicle at a loading dock having a guide rail mountable to a driveway and a carriage movable on the guide rail. A drive mechanism, which may be hydraulic or electric is employed to advance the carriage from a stored position to a position proximate to a wheel of the vehicle. A chock assembly is pivotedly mounted on the carriage and is movable by the drive mechanism from a retracted position to an engaging position. The chock assembly comprises an arm having a sensor bar to contact one portion the wheel and a chock plate movable in response to contact of the sensor against the wheel to contact another portion of the wheel and block movement of the vehicle. A lock assembly is mounted on the guide rail for movement thereon, and is moved by the drive mechanism into contact with the chock plate to restrain the chock plate in the extended position.

14 Claims, 7 Drawing Sheets

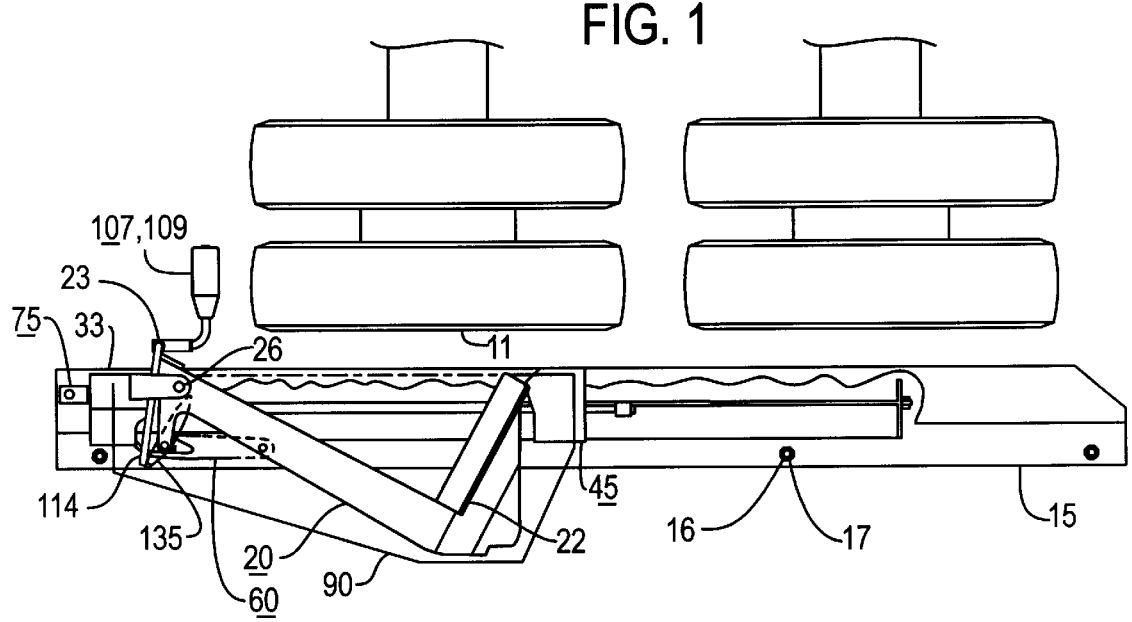
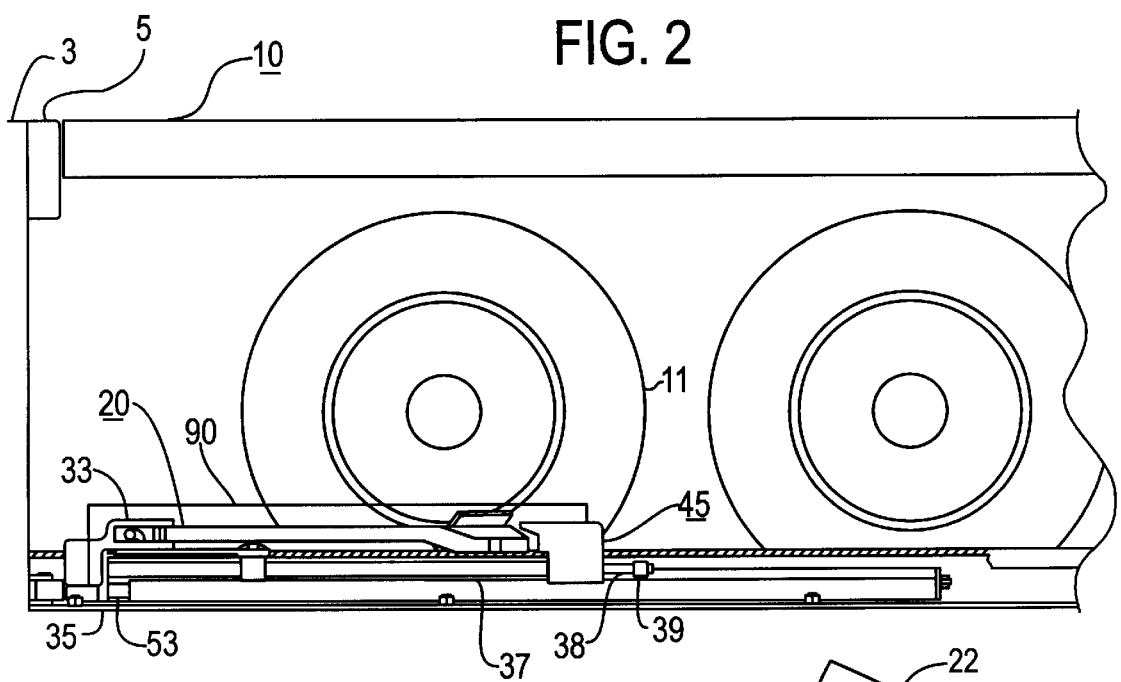
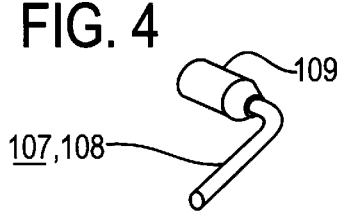
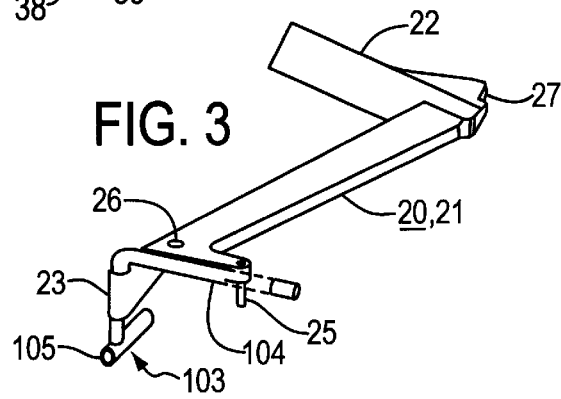

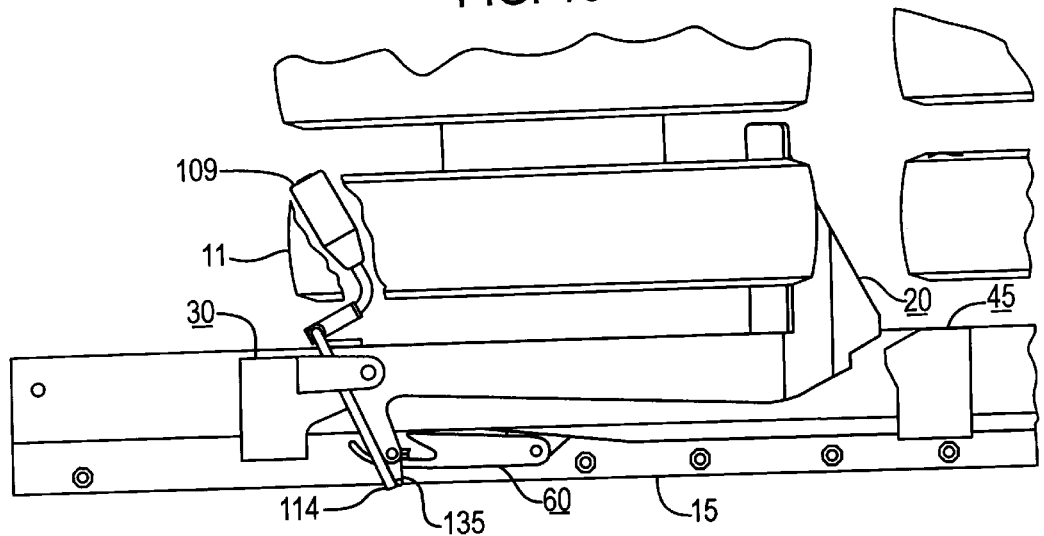
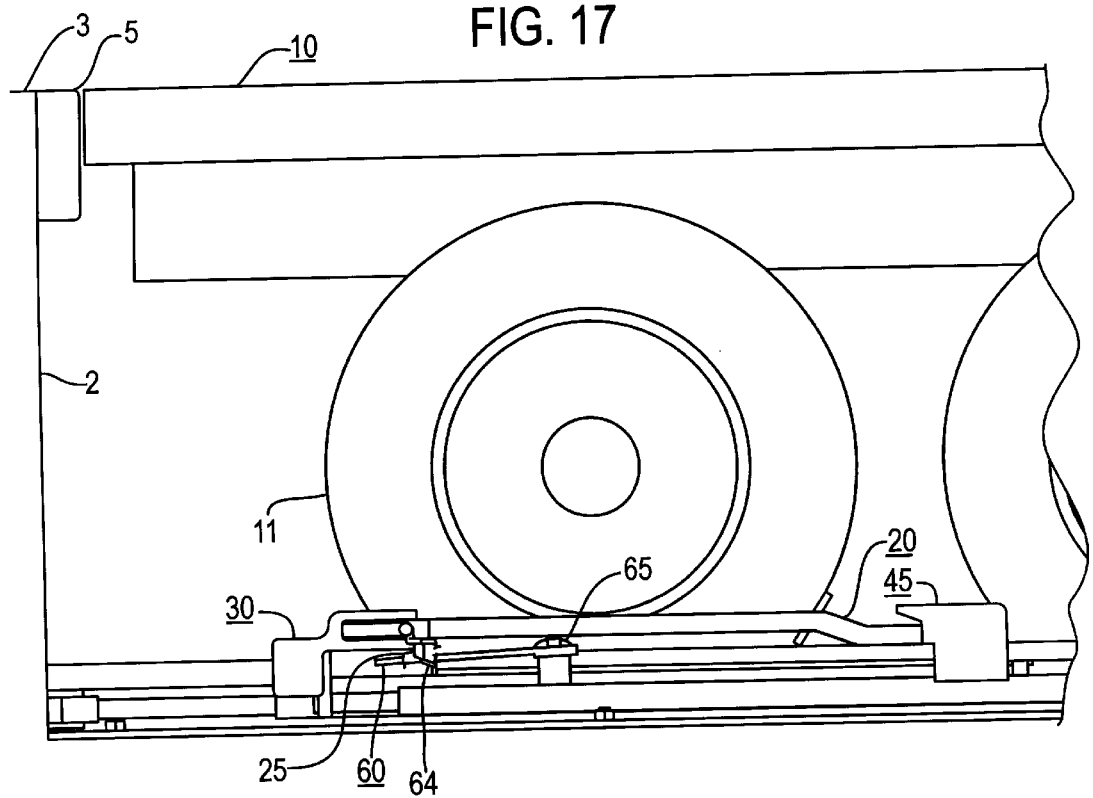

AUTOMATIC WHEEL CHOCK SYSTEM

CROSS REFERENCE TO RELATED APPLICATIONS

This invention is related to applications Ser. No. 08/562,957, filed Nov. 27, 1995, now U.S. Pat. No. 5,709,518 and Ser. No. 08/350,132, filed Apr. 11, 1996 now abandoned for a Continuation application Ser. No. 679,719 now U.S. Pat. No. 5,743,697, both commonly assigned.

BACKGROUND OF THE INVENTION

1. Field of the Invention

This invention is related to material handling equipment and in particular to mechanical devices that restrain a vehicle at a loading dock.

2. Prior Art

Devices that restrain a vehicle against movement away from loading docks are known and widely used. They range from simple wheel chocks to complicated mechanical systems. Mechanical vehicle restraints generally fall into two broad categories, those which restrain by latching on to an abutment of the vehicle, usually the ICC bar and, those which engage a wheel.

Examples of the first type are found in a number of commercial devices such as the Rite-Hite ADL-LDL series and the Serco VR series of vehicle restraints. These devices are covered by U.S. patents, such as U.S. Pat. Nos. 4,264,259; 4,443,150; 5,120,181 and 5,259,718. Such patents are representative of a variety of devices, wall or approach mounted, that move hooks or barriers into position to contact the ICC bar and thus prevent movement away from the loading dock. Such devices have achieved commercial success and are generally effective. They however suffer from operational limitations because of the differences in location and geometry of the target, i.e. the ICC bar. These limitations include a failure to engage in some situations, trailer creep and locking up thus preventing the truck from moving out once the loading operation is complete.

Examples of the second type (wheel chocks) are found in U.S. Pat. Nos. 2,661,505; 3,305,049; 4,207,019; 4,969,792; 5,249,905 and 5,375,965 which show chocking devices which store in the driveway and move toward the wheel to engage and hold the vehicle. These patents represent techniques to automatically place a chock in front of a wheel to prevent a vehicle from moving away from a loading dock, but most have significant limitations. The device shown by Willey in U.S. Pat. No. 3,305,049 is simple in concept, but the screw element that is employed is exposed to impact and could not withstand the lateral and bending forces exerted by the block.

The device shown by Cone in U.S. Pat. No. 4,207,019 occupies space under the rear of the vehicle and could prevent the lowering of a hydraulic tail gate. The device shown by Warner et al in U.S. Pat. No. 5,249,905 provides effective wheel chocking but requires expensive excavation for installation. Also, proper drainage must be provided and heating elements may be required in colder climates.

In U.S. Pat. No. 5,375,965 the chock is placed at the end of a track and the vehicle drives over it. The chock then moves inward toward the wheel until contact is made and then the restraining device is raised to provide a barrier. While eliminating the need for a trench, the device may be damaged as the vehicle rides over it both on entering the dock and leaving. Additionally, the operation requires moving a pair of heavy and complex chock elements on the approach, at positions spaced from the track which may damage the approach itself due to repeated travel, the uneven surface and the presence of obstacles in the path.

Some of these devices have also achieved commercial use but still have serious technical/operational problems. The advantages of this class of vehicle restraint however are that positive engagement with a wheel occurs thus insuring reliability and minimum trailer creep. Nevertheless, these devices tend to be more complex than those restraints which engage the ICC bar and, in some situations require expensive installations such as trenching and the like. Also, they are susceptible to misposition relative to the wheel if the vehicle is not aligned on the approach correctly, i.e. off center or angled.

Additionally, these devices, prior to this invention, approach the vehicle from the front of the approach and move then toward the dock face until they engage the vehicle. This causes storage problems and requires a long run of track or drive member to move the chock into position.

Thus, one limitation common to most automatic wheel chocking devices is that they usually travel through a greater distance and therefore require a much longer time to engage than devices which hook on to the ICC bar. The position of the wheels on the rearmost axle relative to the rear of a vehicle can vary by many feet. Therefore the chock must be able to travel through a long distance to ensure that it can engage the wheels of a variety of vehicles. Usually the chock must overcome a relatively low force to travel from the stored position to engage the wheel, and then must exert a significantly higher force against the wheel to secure the vehicle. Similarly, a high force may be required to dislodge the chock from the wheel because it may have become wedged tightly due to the vehicle being forced away from the loading dock during the loading operation. Also, a high force may be required to dislodge the chock from the stored position in winter conditions. The requirement of high force and fast travel speed through a long distance can be met by a powerful drive mechanism. However, this significantly increases the cost of the drive components as well as the cost of electrical wiring to the drive unit.

As a consequence of these diverse requirements there is a need in the art for a wheel chock using a variable force drive to move the device into position and extend and retract the chock that is less complicated and less expensive than prior devices.

There also exists in the art a need for a wheel chock that is rugged and can withstand abuses of daily use and environmental effects of rain, snow and ice.

SUMMARY OF INVENTION

In co-pending U.S. patent application Ser. No. 08/350,132 an automatic chock is disclosed which engages the wheel of a transport vehicle to prevent it from moving away from a loading dock by having a chock move forward from the loading dock and then swing restraining elements into position once the proper location relative to a wheel is determined. The automatic wheel chock is combined with a guide rail which carries the wheel chock and also acts to guide the wheels of the transport vehicle to position it relative to the loading dock. It can be used to engage a single wheel, or as one of a symmetrically opposite pair to engage a wheel on each side of the vehicle.

The automatic wheel chock of the present invention is an improvement over that set forth in the earlier applications. It has several advantages over existing devices. Because it is stored against the dock face and approaches the trailer from the rear, it engages the rear-most set of wheels and is not affected by the number or position of other axles. It can be easily mounted to an existing driveway and thus installation does not require the expense of excavation and concrete construction. Because it is mounted off to the side of the dock, the driveway is left unobstructed for easy removal of snow or debris. Also, since it can rest on the surface of the driveway rather than in a pit, it does not require a drain. Furthermore, it is easily accessible for service, and can be easily detached and moved to a new location.

In the prior applications, the sensing arm was in a fixed relationship to the chock. In this invention, the sensor arm pivots and carries a roller that engages the wheel. This arrangement solves two problems in prior devices. First, mounting a fixed arm to contact the wheel at a low position, as in the prior devices, creates a downward vertical force that is greater than the horizontal force required to rotate the chock. Such a downward force could induce twisting forces on the pivot pin which could then increase the force necessary to move the chock. The roller transfers this vertical force directly into the roadway surface.

Additionally, the roadway will not always be perfectly level so there will be differences between the wheel height relative to the rail. For example, if the wheel came to rest in a depression on the roadway, a fixed sensor would contact the wheel at a higher point on the wheel. This in turn would cause the carriage to stop further back relative to the axle of the wheel and the chock would rotate too soon, potentially interfered by the front of the wheel.

The use of the roller therefore provides a more accurate methodology of sensing the position of the wheel. This invention is effective as a restraining chock to engage a wheel closest to the loading dock face. It will restrain a vehicle having two axles or more, trucks or semitrailers, irrespective of the number of wheels on each axle. Thus, as used herein, the phrase "separated axles" means any combination of two axles on a vehicle. It includes the two rear axles on a semi-trailer as well as the front steering axle and the rear driving axle of a two-axle vehicle. The phrase is used to describe the initial positioning of the chock in front of one axle but to the rear of another axle in the context of any pair of axles on the vehicle.

Another aspect of this invention that is different from the prior devices is the use of a brake to insure that the chock is fully retracted prior to moving rearward so that it does not strike the front of the wheel and prevents the carriage from moving into the stored position. The brake is automatically released when the lock assembly contacts the carriage assembly.

These and other aspects of this invention will be described in greater detail by reference to the attached drawing and the description of the preferred embodiment that follows.

BRIEF DESCRIPTION OF THE DRAWING

FIG. 1 is a plan view, partially cut-away, of the preferred embodiment of this invention illustrating the wheel chock in a retracted position;

FIG. 2 is a side view, partially cut-away, illustrating the wheel chock in a retracted position;

FIG. 3 is a detailed view of the chock assembly;

FIG. 4 is a detailed view of the sensing roller assembly;

FIG. 16 is a plan view illustrating the latch re-setting;

FIG. 17 is a side view illustrating the latch re-setting;

DESCRIPTION OF THE PREFERRED EMBODIMENT

Figure 5A:
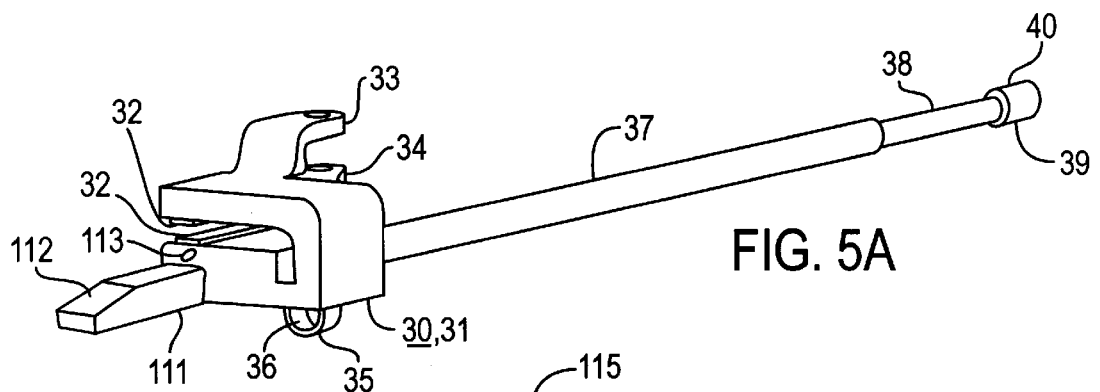
FIG. 5A is a detailed view of the components of the carriage assembly.

Referring first to FIGS. 1 and 2, a plan view and side view respectively of a typical loading dock are depicted which has a driveway surface 1, a dock face 2 and a dock floor 3. Dock bumpers 5 limit the position of the transport vehicle 10 and protect the dock wall from impact damage. The vehicle 10 is shown for purposes of illustration with two separated axles each having wheels 11, as typically found on a semi-trailer. It will be understood that the utilization of this invention is not in any way restricted by the wheel/axle configuration of the vehicle to be retained. Thus, the phrase "separated axles" means any two axles on the vehicle. It covers the closely spaced axles on the rear of a semi-trailer equally as separated axles on a two-axle vehicle.

An automatic chocking device is shown with the chock retracted in the stored position. In FIGS. 1 and 2 the chocking device is shown partially cut away to reveal the internal components. FIG. 3 illustrates the chock assembly 20 with an arm 21. One end of the arm 21 has a control arm 24 with a pin 25, a pivot hole 26, and a vertical pivot housing 23 which carries a lever assembly 103 comprising an arm 104 and a horizontal pivot housing 105. The other end has a chock plate 22 which contacts the front of the wheel of the vehicle 10 and a locking surface 27.

FIG. 4 illustrates the sensing roller assembly 107 comprising an axle 108 and a roller 109.

FIG. 5A illustrates the carriage assembly 30 for the chock assembly 20. A housing 31 is shaped to fit freely around the upper portion of the guide rail 15 (see FIG. 2), and preferably has low friction bearing plates 32 fitted into internal recesses of the housing to reduce the friction when sliding along the track. Two mounting lugs 33 and 34, attached to the top of the housing, each have a vertical hole for mounting the chock assembly 20. A flange 35 with a hole 36 extends from the bottom of the housing 31. A brake wedge 111 protrudes from the front of the housing and has an angled surface 112. The housing 31 has a guide hole 113 above the brake wedge 111. A bar 37 has one end attached to the housing and has at the other end a shaft 38. A collar 39 is attached to the end of the shaft 38 by means of a pin 40.

Figure 5B:
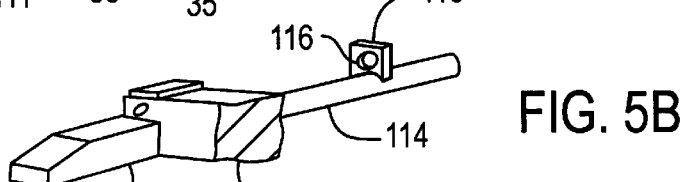
FIG. 5B is a partial view of the carriage assembly.

FIG. 5B is a view of the carriage housing 31 partially cut away to illustrate a guide bar 114 protruding from the front side of the housing. The bar 114 carries a plate 115 with a guide hole 116.

Figure 6:
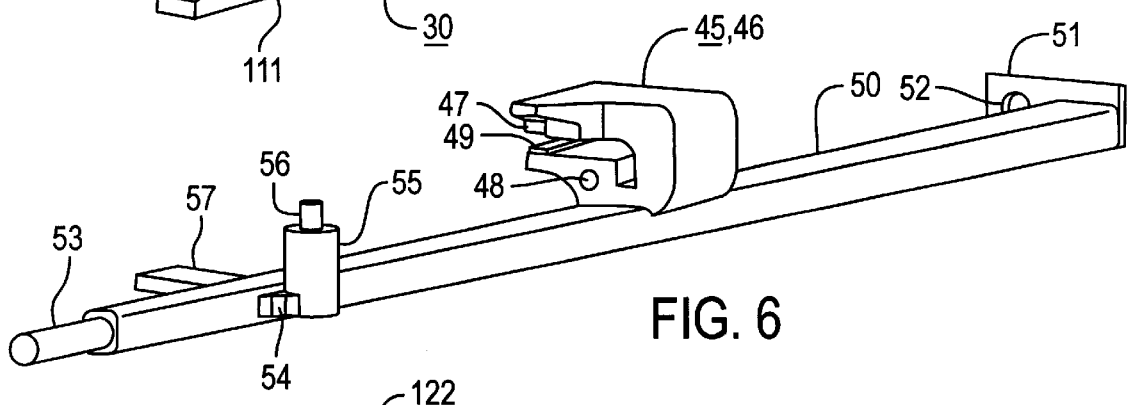
FIG. 6 is a detailed view of the lock assembly.

FIG. 6 illustrates the lock assembly 45. A housing 46 is shaped to fit freely around the upper portion of the guide rail 15 (see FIGS. 2 and 3) and is attached to a bar 50. A locking cam surface 47 projects rearward from the top the housing and a hole 48 which passes through the lower part of the housing. The housing 46 has low friction bearing plates 49 fitted into internal recesses of the housing in a manner similar to those in the housing 31 of the carriage assembly 30. One end of the bar 50 has a plate 51 with a hole 52 to carry one end of a hydraulic cylinder 70 See FIG. 9). The other end has a shaft 53. Also attached to the bar 50 is a bracket 54, a boss 55 a vertical pin 56 and a horizontal bar 57.

Figure 7:
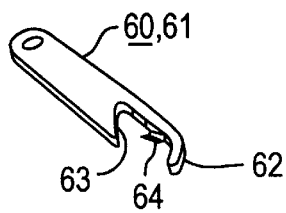
FIG. 7 is a detailed view of the latch assembly.

FIG. 7 illustrates a latch assembly 60 with a cam plate 61. The cam plate has an elongated curved cam surface 62 and a shorter angled cam surface 63. A latch plate 64 is attached to the elongated cam surface 62.

Figure 8:
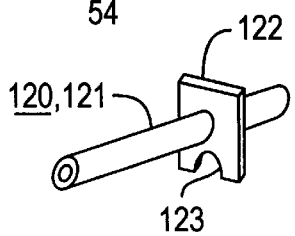
FIG. 8 is a detailed view of the brake release tube assembly.

FIG. 8 illustrates a brake release tube assembly 120 with a tube 121, and release plate 122 with a guide slot 123.

Figure 9:
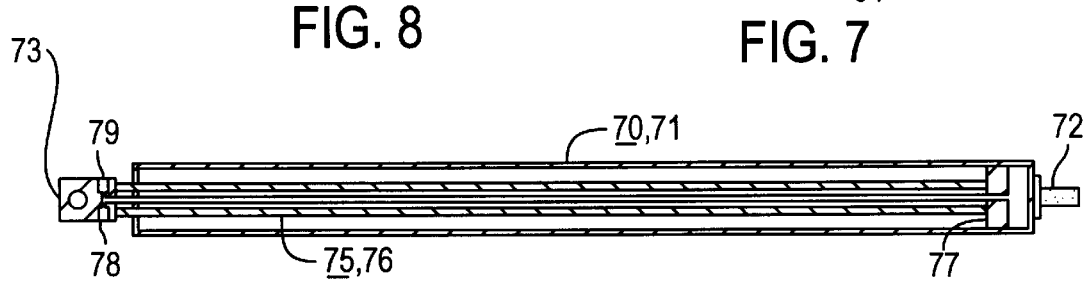
FIG. 9 is a sectional view of the hydraulic cylinder.

FIG. 9 illustrates the double acting hydraulic cylinder assembly 70 with a cylinder barrel 71 and a threaded mounting bolt 72. A rod assembly 75 has a rod 76 and a piston 77. The ports 78 and 79 are placed in the end of the rod 76 to eliminate external plumbing which would otherwise be required to both ends of a conventional cylinder. Fluid is carried to the cylinder from the ports through hollow passages in the cylinder rod.

When hydraulic fluid is pumped in through the port 78, the pressure on the piston 77 causes the rod assembly 75 to extend, and when hydraulic fluid is pumped in through the port 79, the pressure on the rod side of the piston causes the rod assembly to retract. The rod assembly can be anchored by a pin (see FIG. 9) through the hole 73 in the end of the rod 76 and the cylinder barrel 71 will then move without any hoses being exposed.

Figure 10:
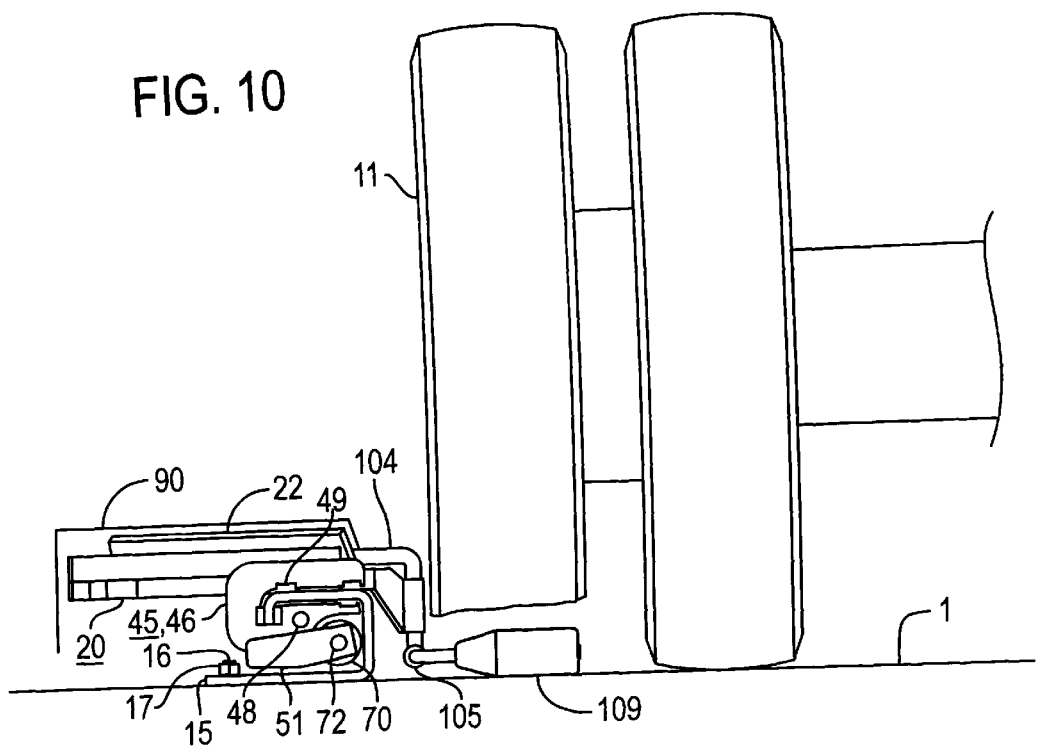
FIG. 10 is a front view with the vehicle wheel partially cut-away to reveal the sensor roller.

FIG. 10 illustrates a front view, i.e. looking in toward the loading dock, of the guide rail 15. The guide rail is shown attached to the surface of the driveway by anchor bolts 16 and nuts 17. Alternately it may be welded to a steel plate which has been embedded in the concrete of the driveway. The technique of affixation is not critical to this invention so long as the guide rail is secured. The wheel 11 is partially cut away to illustrate the sensing roller assembly 109.

Figure 11:
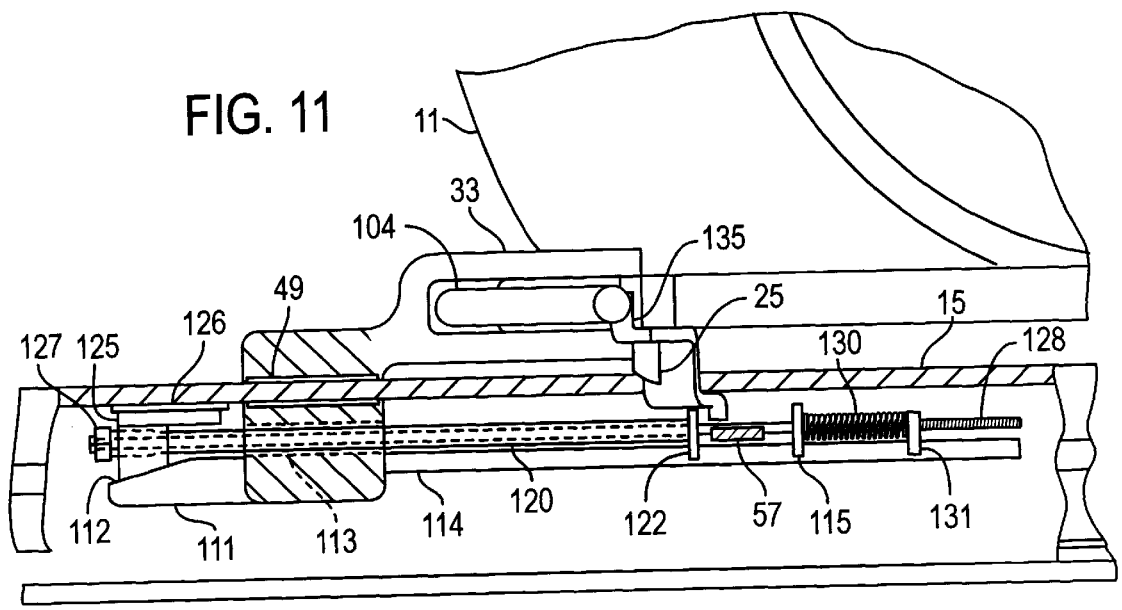
FIG. 11 is a side view, partially cut-away, illustrating the carriage brake and release mechanism.

In FIG. 11 the chocking device is shown partially cut away to reveal the components of the carriage brake mechanism. A brake shoe 125 with a friction surface 126 rests on the angled surface 112 of the brake wedge 111. A brake release adjusting bolt 127 with an internal axial hole is threaded into the rear of the brake shoe 125. A release tube assembly 120 is inserted through the guide hole 113 of the housing 31 and into the front of the brake shoe 125. The release plate 122 is guided by the bar 114 passing through the slot 123. A long spring tensioning bolt 128 is inserted through the brake release adjusting bolt 127, through the release tube assembly 120, and through the hole 116 in the plate 115. A brake spring 130 is placed on the spring bolt 128 and compressed by a nut 131. The nut can be prevented from rotating by a tab extending to engage the guide bar 114. The tension of the spring 130 holds the brake shoe in contact with the underside of the guide rail 15. The carriage assembly 30 can be moved forward along the rail 15 by overcoming the tension of the brake spring 130. However, when the carriage assembly is forced toward the wall, the brake is self-energized by the wedging action of the brake shoe 125 sliding up the sloped surface 112 of the brake wedge 111 and this prevents the carriage assembly 30 from moving.

Figure 12:
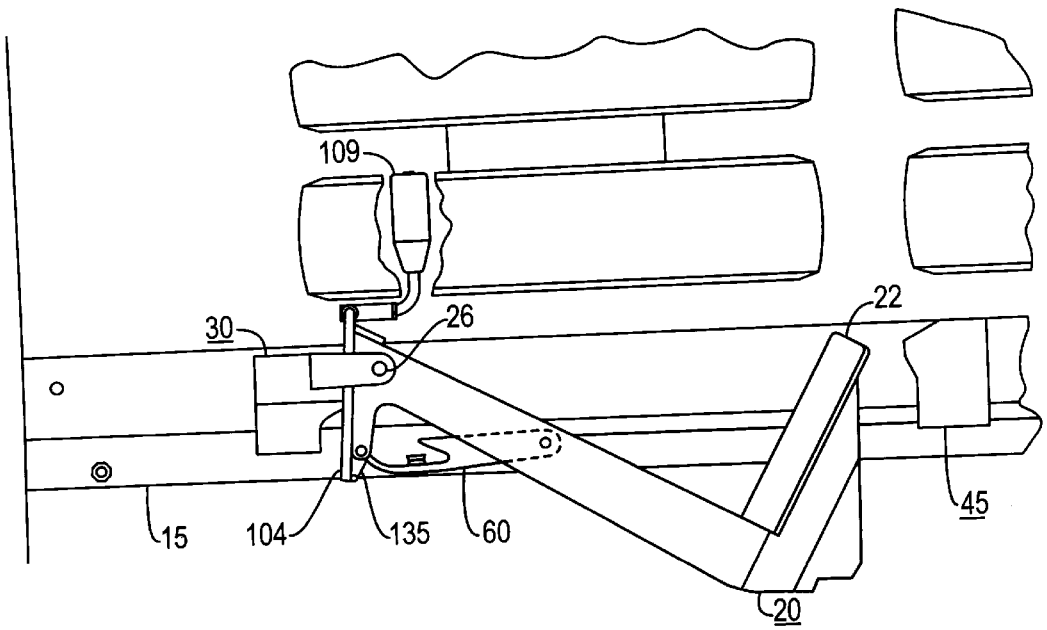
FIG. 12 is a plan view illustrating the cylinder extending as the wheel chock moves away from the wall and into engagement with the wheel.

The brake can be released by forcing the release tube assembly 120 against the end of the brake release adjusting bolt 127 and moving the brake shoe 125 away from the wedge 111. The brake can be released in one of two ways. When the lock assembly 45 is moved fully against the carriage assembly 30 as in FIG. 1, the horizontal bar 57 on the lock assembly 45 will engage the release plate 122. The release position of the brake relative to the position of the lock assembly 45 can be varied by turning the brake release adjusting bolt 127 into and out of the brake shoe 125. The second release method is by exerting rearward pressure on the sensing roller 109. This causes the lever 104 to pivot in the housing 23 of the chock assembly 20. As illustrated in FIG. 12, a brake release lever 135 pivots on the pin 25. The end of the lever 104 moves the outer end of the brake release lever 135 forward, causing the inner end of the brake release lever to move rearward and engage the release plate 122.

The relationship of the components thus far discussed is shown in FIGS. 1, 2, 10, 11 and 12. The carriage assembly 30 and the lock assembly 45 are mounted on the rail 15, as illustrated in FIG. 2. The shaft 53 of the lock assembly 45 fits into the hole 36 in the flange 35 of the carriage assembly 30 and the shaft 38 fits into the hole 48 in the lock assembly housing 46. Thus, the carriage assembly 30 and the lock assembly 45 are provided with resistance against lateral motion by the rail 15 and are provided resistance against twisting motion by engagement with each other. The lock assembly 45 has freedom of axial motion relative to carriage assembly 30 limited by the housing 46 of the lock assembly 45 being trapped between two shoulders on the shaft 38 formed by the bar 37 and the collar 39 (FIG. 5A).

Figure 13:
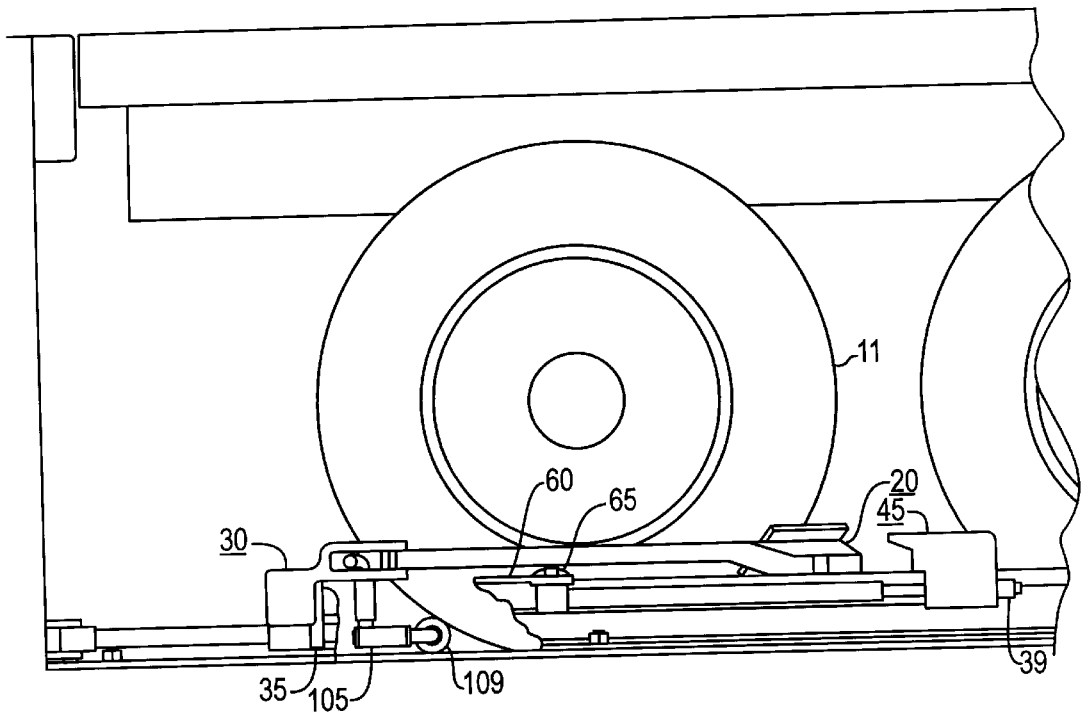
FIG. 13 is a side view illustrating the cylinder extending with the device partially cut-away to reveal the sensor roller in contact with the wheel.

The chock assembly 20 is mounted between the lugs 33 and 34 of the carriage assembly 30 and pivots on a pin placed in hole 26. The sensing roller assembly 107 is carried by horizontal pivot housing 105. The roller 109 rests on the driveway and is free to pivot up and down with variations in the driveway surface. The latch assembly 60 pivots on the pin 56 of the lock assembly 45 and is held by a spring 65 as shown in FIGS. 2 and 13. The latch assembly can rotate horizontally to any position about the vertical axis of the pin 56, but friction produced by the pressure of the spring 65 causes the latch assembly to maintain its position until it is moved by an external force. The latch assembly 60 also has freedom for limited vertical rotation away from the horizontal plane, but the pressure of the spring 65 forcing the plate 61 against the top of the boss 55 causes the latch assembly to return to the horizontal plane. Preferably the actuating mechanism is enclosed by a cover assembly 90 as shown cut away in FIGS. 1, 2 and 10. The rear of the cover is attached to the carriage assembly 30 and the forward end of the cover is supported by the lock assembly 45. The cover 90 protects the mechanism from the elements and also protects personnel from contact with moving parts.

In operation, when no transport vehicle 10 is at the dock, the chock 20 is retracted outside of the vertical surface of the guide rail as shown on FIGS. 1 and 10. The carriage assembly 30 is positioned at the rear of the guide rail 15 near the dock wall 2. When a vehicle 10 being backed up to the dock is not properly positioned to the dock, the outer rear wheel 11 will be guided by the vertical surface of the rail 15. That is, the rail 15 tends to guide the vehicle so that it is pre-positioned relative to the chock mechanism. When the chock device is actuated, hydraulic fluid is pumped from a hydraulic power unit (not shown) to the port 78 on the cylinder rod assembly 75 and this causes the hydraulic cylinder 70 and the lock assembly 45 to be pushed forward away from the dock wall 2. As the lock assembly moves forward, the end of the cam surface 62 is deflected by the pin 25 which causes the latch assembly 60 to rotate counter-clockwise as shown in FIG. 12. The latch assembly is held in the rotated position by the friction of the spring 65 (see FIG. 13).

As the cylinder 70 extends, the housing 46 of the lock assembly contacts the collar 39 on the carriage assembly 30 and causes the carriage assembly to move forward. As the carriage assembly 30 continues to move forward, away from the loading dock, the sensing roller 109 contacts the rear of the wheel 11 as shown in FIGS. 12 and 13. The small diameter of the roller 109 allows it to pass under a mud flap or a lowered hydraulic tail gate to contact the rear of the wheel 11. The vertical freedom of the roller assembly allows the roller to contact the driveway and the wheel 11 with minimal vertical force transferred to the chock assembly 20. A fixed sensor bar contacting the wheel at such a low height would generate a vertical force greater than the horizontal force and might create a twisting force which prevents the chock assembly from pivoting freely.

Figure 14:
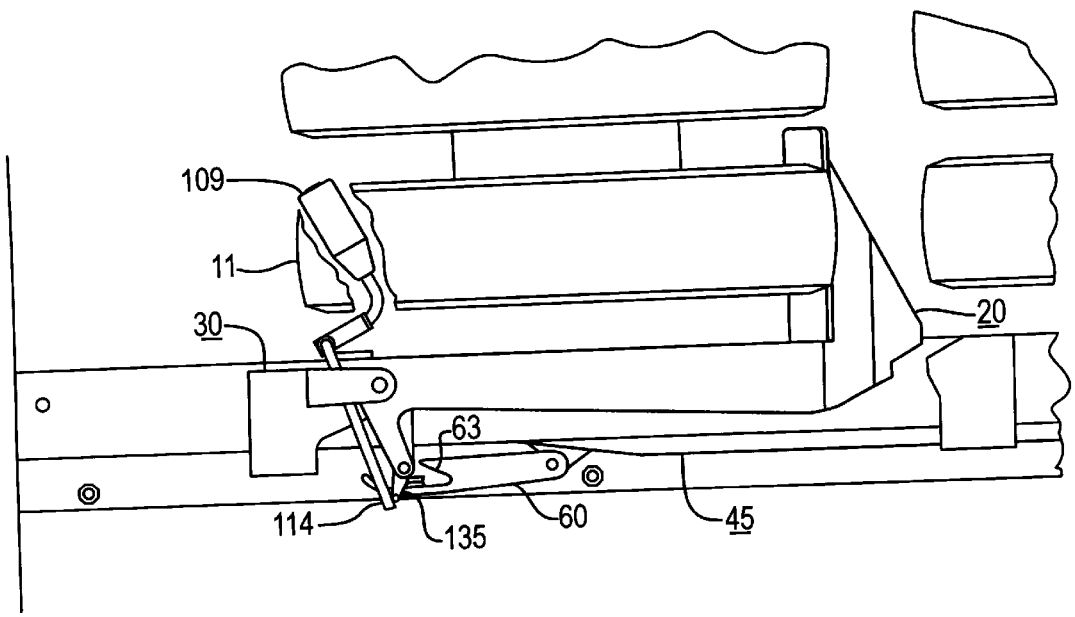
FIG. 14 is a side view illustrating the chock extended to engage a wheel.

As the cylinder 70 continues to extend, the horizontal force on the roller 109 causes the chock to extend in front of the outer rear wheel as shown in FIG. 14. When the chock is fully extended the sensing roller 109 is forced against the back of the tire and the carriage assembly 30 and lock assembly 45 will be prevented from moving. The hydraulic pressure will increase and will be sensed by an electrical pressure switch or by a spring sequence valve (not shown), both of which are well known in the loading dock industry. The power unit will then direct hydraulic fluid through the port 79 to the rod side of the cylinder 71 and cause the cylinder 70 to retract. The lock assembly 45 will then move rearward toward the dock. The locking surface 47 of the lock assembly will engage the locking surface 27 of the chock assembly 20 and the chock assembly 20 will be locked in the extended position as shown on FIG. 15.

Figure 15:
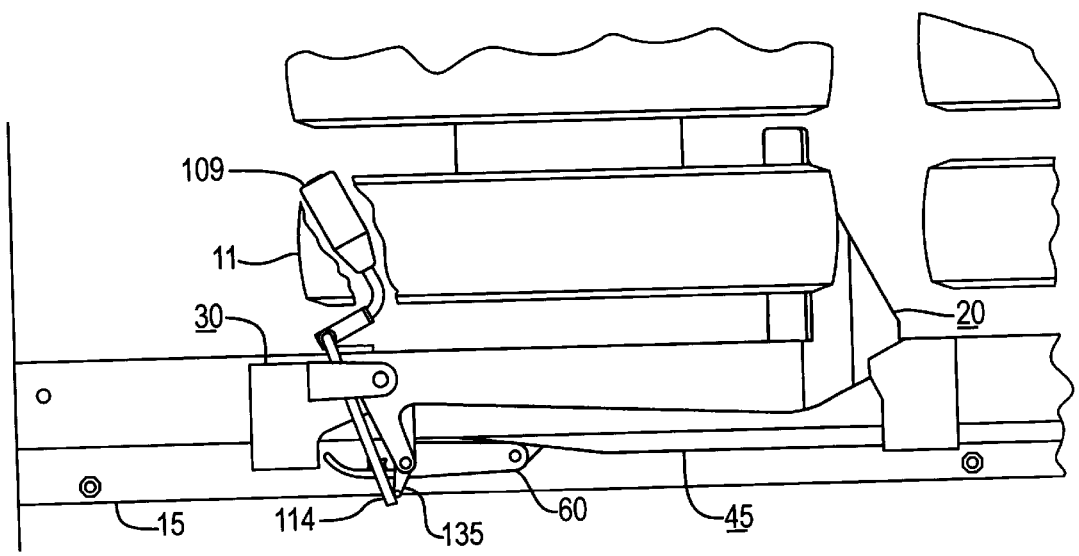
FIG. 15 is a plan view illustrating the chock engaging a wheel and locked to restrain a vehicle.
Figure 18:
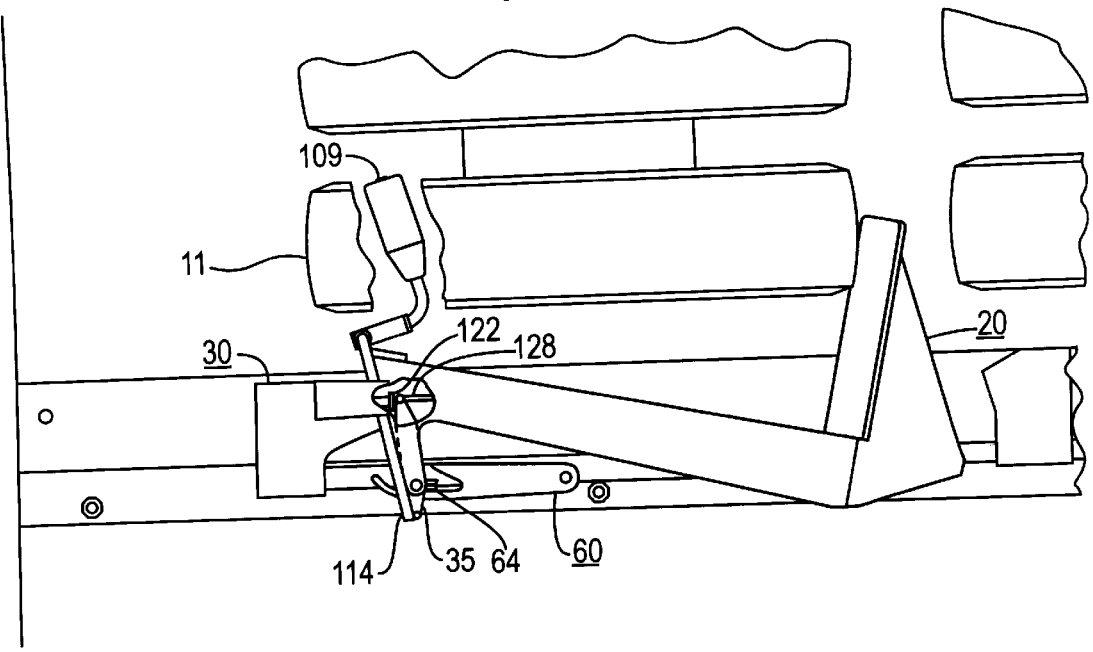
FIG. 18 is a plan view illustrating the chock retracting to disengage the wheel and the brake being released.
Figure 19:
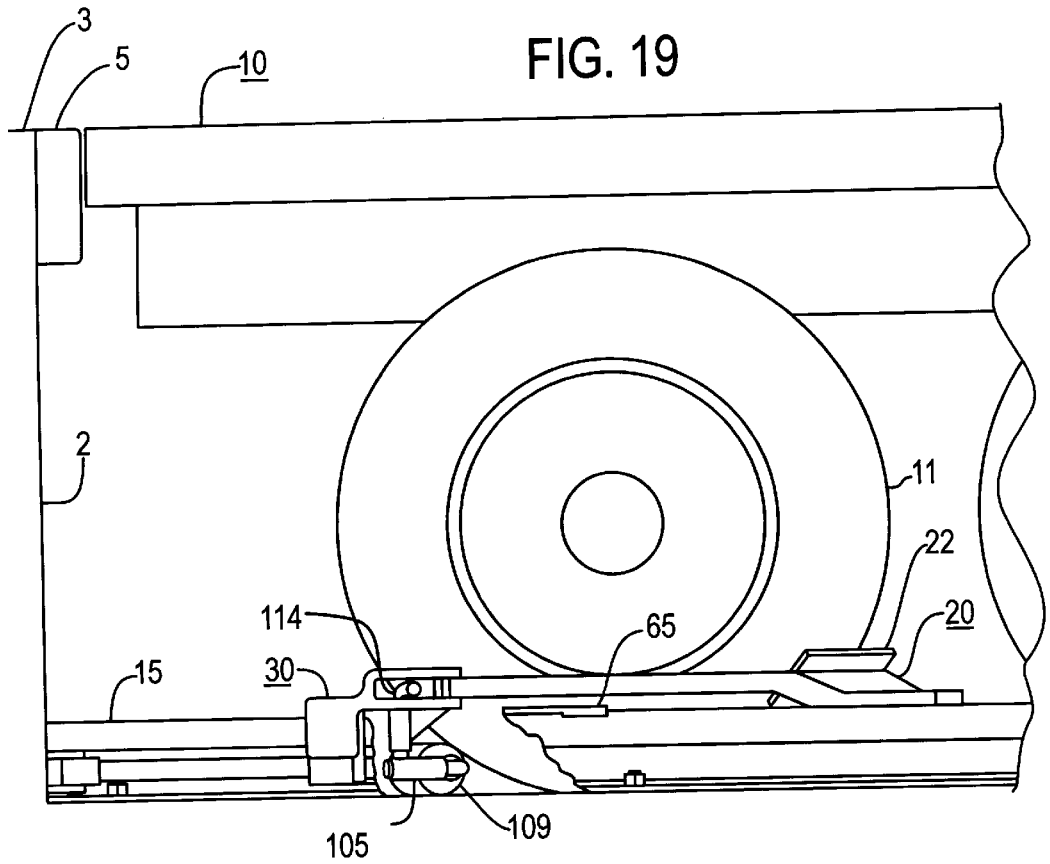
FIG. 19 is a side view illustrating the chock retracting to disengage the wheel with the device partially cut-away to reveal the sensor roller in contact with the wheel.

FIGS. 14 and 15 illustrate the chock engaging the front of the wheel 11. As the lock assembly 45 moves rearward towards the carriage assembly 30, the cam surface 63 of the latch assembly 60 will engage the pin 25. As the cam surface 63 is guided by the pin, the latch assembly 60 will rotate clockwise to the initial position as shown in FIG. 15.

The horizontal bar 57 on the lock assembly 45 will engage the brake release plate 122 on release tube 120. The elements are illustrated in FIG. 11. When the brake is released the carriage assembly 30 will move rearward, toward the dock, and the chock surface 22 is held firmly against the wheel 11 preventing the vehicle 10 from moving. The pressure switch will then sense the increase in pressure and cause the power unit to stop and the vehicle 10 will be secured.

When the loading operation is completed and the vehicle is to be released, the hydraulic cylinder 70 is extended. The lock assembly 45 moves forward and releases the locking surface 27 of the chock assembly 20 as illustrated in FIG. 16. As the lock assembly moves forward the angled latch plate 64 of the latch assembly 60 is deflected downward by the lower end of the pin 25 on the chock assembly 20. This is shown in FIG. 17 where a portion of the latch assembly 60 is cut away to show the latch plate 64 and the pin 25. When the lock assembly moves fully forward the latch plate 64 will pass under the pin 25 and the spring 65 will cause the latch assembly to rotate back to the horizontal plane with the latch plate positioned in front of the pin 25.

The lock assembly 45 will move the carriage assembly 30 forward until the sensing roller 109 again contacts the rear of the wheel 11 and the pressure switch will then cause a valve to shift and the hydraulic cylinder 70 to retract. The latch bar 64 will engage the front of the pin 25, preventing the lock assembly 45 from moving closer to the carriage assembly to engage the locking surface 27 of the chock 20, and also urging the chock assembly 20 to rotate toward the retracted position. The carriage assembly is prevented from moving toward the wall 2 by the brake engaging the under-side of the rail 15 as shown in FIG. 11. The force of the latch bar 64 against the front of the pin 25 will force the chock to rotate away from the wheel 11. If the wheel 11 is large, as the chock rotates, the roller 109 may move against the rear of the wheel. The force on the roller 109 would resist the rotation of the chock assembly 20. However, force on the roller will also cause the lever 104 to rotate against the outer end of the brake release lever 135. The inner end of the brake release lever will engage the release plate 122 and cause the brake to release and allow the carriage assembly 30 move until the force on the roller 109 is reduced. Thus the chock assembly 20 will continue to rotate until it is fully retracted. As the lock assembly 45 moves closer to the carriage assembly 30 the horizontal bar 57 on the lock assembly will engage the brake release plate 122 and allow the entire mechanism to move to the stored position against the wall 3 as illustrated in FIG. 1.

When the carriage assembly 30 has moved fully rearward along the rail, a limit switch (not shown) mounted at the end of the rail 15 will sense the carriage position and cause the power unit to stop with the chock in the stored position. If the switch should malfunction, the pressure switch will sense the increase in hydraulic pressure and then cause the power unit to stop.

Modifications of this invention are possible. For example, while a hydraulic cylinder is shown, the chocking device of this invention could be powered by other means such as an electric motor driving a screw, or chain and sprockets. Also, there other possible configurations of the latch which controls the locking and release of the chock assemblies. This chocking device could be used alone, or in pairs to chock the wheels on both sides of the vehicle.

I claim:

1. A system for restraining a vehicle positioned at a loading dock, said vehicle having separated axles with tires mounted on each axle, said system comprising;

a member movable from a stored position adjacent the loading dock to an operative position adjacent a rear tire which mounted on a vehicle axle that is closest to said loading dock, at least one wheel chock carried by said member and movable therewith to said operative position, said wheel chock movable from a stored position to an extended position between said separated axles and engaging said rear tire, a sensor carried by said member and movable therewith to engage said rear tire to determine the operative position of said member relative to said rear tire, a mechanism carried by said member and operably connected to sensor and to said least one chock to extend and retract said least one chocks, wherein said member comprises a movable carriage, said system further comprising a lock assembly carried by said carriage and movable to engage and lock said chock in said operative position; and a brake member carried by said carriage to restrain movement of said carriage, said lock assembly engaging said brake to release it and permit movement of said carriage in a direction toward said dock, whereby said chock is moved to a locking position against said rear tire.

2. The system of claim 1 wherein said sensor comprises a roller pivotally mounted on said movable member, and said mechanism comprises a contact member responsive to continued movement of said movable member after said sensor contacts said rear tire to extend said chock.

3. The system of claim 1 further comprising a latch assembly carried by said carriage and responsive to movement of said lock assembly to permit said chock to be retracted.

4. A system for restraining a vehicle positioned at a loading dock, said vehicle having separated axles with tires mounted on each axle, said system comprising;

a member movable from a stored position adjacent the loading dock to an operative position spaced from said loading dock and adjacent a rear tire which mounted on a vehicle axle that is closest to said loading dock, a wheel chock carried by said member and movable from a stored position, when said member is positioned at said operative position, to an extended position contacting said rear tire at a position to prevent movement of said vehicle away from said loading dock, a pivotable sensor carried by said member to position said member at said operative position relative to said rear tire by contact therewith at a position located on a side of said rear tire closer to said loading dock than a position where said chock contacts said tires, wherein said member comprises a movable carriage, said system further comprising a lock assembly carried by said carriage and movable to engage and lock said chock in said operative position, and a brake member carried by said carriage to restrain movement of said carriage, said lock assembly engaging said brake to release it and permit movement of said carriage in a direction toward said dock, whereby said chock is moved to a locking position against said rear tire.

5. The system of claim 4 wherein said sensor comprises a roller pivotally mounted on said movable member, and said mechanism comprises a contact member responsive to continued movement of said movable member after said sensor contacts said rear tire to extend said chock.

6. The system of claim 4 further comprising a latch assembly carried by said carriage and responsive to movement of said lock assembly to permit said chock to be retracted.

7. A system according to claim 4 further comprising means coupled to said movable member for moving said movable member forward from said stored position adjacent to said loading dock to said operative position and for subsequently moving said movable member in a direction toward said stored position to engage said chock with said rear tire when said chock is in said extended position.

8. A system for restraining a vehicle positioned at a loading dock, said vehicle having pairs of tires mounted on separated axles, said system comprising;

a member movable on a rail along side one of said separated axles;

said member including a pair of tire engaging elements movable therewith;

one of said tire engaging elements comprising a sensor carried by said member and contacting a first portion of a tire located on a rearmost axle that is closest to said loading dock and, the other of said tire engaging elements comprising a chock carried by said member and movable to a position between said separated axles to engage a second portion of the same tire contacted by said sensor to restrain said vehicle from movement forward from said loading dock;

a mechanism operably coupled to said sensor and said chock to extend said chock after said tire is contacted by said sensors, wherein said member comprises a movable carriage, said system further comprising a lock assembly carried by said carriage and movable to engage and lock said chock in an operative position; and a brake member carried by said carriage to restrain movement of said carriage, said lock assembly engaging said brake to release it and permit movement of said carriage in a direction toward said dock, whereby said chock is moved to a locking position against said rear tire.

9. A system according to claim 8 further comprising means coupled to said movable member for moving said movable member forward in a first direction from a stored position adjacent to said loading dock to said operative position for placement relative to a pair of tires mounted on said axle closest to said loading dock and subsequently moving said chock in a second direction to extend said chock.

10. A system according to claim 9 further comprising means for determining when said chock and said movable member are moving in a direction toward said stored position for extension of said chock with said tire and for stopping extension of said chock.

11. A system according to claim 9 further comprising means coupled to said movable member for moving said movable member forward from said stored position to said operative position and for subsequently moving said movable member in a direction toward said stored position to engage said chock with said rear tire when said chock is in said extended position.

12. The system of claim 8 wherein said sensor comprises a roller pivotally mounted on said movable member, and said mechanism comprises a contact member responsive to continued movement of said movable member after said sensor contacts said rear tire to extend said chock.

13. The system of claim 8 further comprising a latch assembly carried by said carriage and responsive to movement of said lock assembly to permit said chock to be retracted.

14. A system for restraining a vehicle positioned at a loading dock, said vehicle having separated tires mounted on an axle, said system comprising;

a carriage member movable from a stored position adjacent said loading dock to an operative position under said vehicle and between said separated tires;

said carriage member having a pair of tire connecting elements mounted on said carriage member and movable therewith, said pair tire contacting elements comprising a sensor carried by said carriage member and engaging one surface of one of said tires to determine a stopping position of said carriage member relative to said pair of tires as said carriage member moves from said stored position and, the other of said pair of tire contacting members comprising a restraining member to prevent movement of said vehicle away from said loading dock;

a mechanism mounted to said carriage member and coupled to said sensor to move the restraining element to a forward extended position; and a brake member carried by said carriage member to prevent movement of said carriage member in a direction toward said stored position.

* * * * *